United States Patent
Boutcher et al.

(10) Patent No.: US 6,370,531 B1
(45) Date of Patent: Apr. 9, 2002

(54) METHOD AND COMPUTER PROGRAM PRODUCT FOR AUTOMATIC CONVERSION OF DATA BASED ON LOCATION EXTENSION

(75) Inventors: David Charles Boutcher, Rochester; Aleesa Mae Kobi, Kasson; Bridget Marie Meyer; Bruce Hubbard Vining, both of Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/137,729

(22) Filed: Aug. 21, 1998

(51) Int. Cl.$^7$ ................................ G06F 17/30
(52) U.S. Cl. ................... 707/10; 707/203; 707/204; 707/500; 709/201; 709/223; 709/225; 709/245; 709/246; 705/54; 713/200; 717/11
(58) Field of Search .................. 709/201, 223, 709/225, 226, 245, 246, 219, 203, 229; 707/10, 204, 203, 500; 711/4, 202; 705/54, 26, 52, 59; 713/200; 717/11; 379/220; 370/401

(56) References Cited

U.S. PATENT DOCUMENTS

| | | | | |
|---|---|---|---|---|
| 5,187,787 A | * | 2/1993 | Skeen et al. | 709/300 |
| 5,341,499 A | * | 8/1994 | Doragh | 709/301 |
| 5,564,017 A | * | 10/1996 | Corn et al. | 709/227 |
| 5,692,129 A | * | 11/1997 | Sonderegger et al. | 707/10 |
| 5,740,370 A | * | 4/1998 | Battersby et al. | 709/219 |
| 5,761,499 A | * | 6/1998 | Sonderegger | 707/10 |
| 5,781,738 A | * | 7/1998 | Corn et al. | 709/227 |
| 5,859,978 A | * | 1/1999 | Sonderegger et al. | 395/200.56 |
| 5,893,118 A | * | 4/1999 | Sonderegger | 707/203 |
| 5,948,064 A | * | 9/1999 | Bertram et al. | 709/225 |
| 5,999,968 A | * | 12/1999 | Tsuda | 709/213 |
| 6,021,496 A | * | 2/2000 | Dutcher et al. | 713/202 |
| 6,065,043 A | * | 5/2000 | Domenikos et al. | 709/203 |

* cited by examiner

Primary Examiner—Jean M. Corrielus
(74) Attorney, Agent, or Firm—Joan Pennington; Roy W. Truelson

(57) ABSTRACT

A method and computer program product are provided for automatic conversion of data by a server computer system based on a location extension in a universal naming convention (UNC) name. Responsive to receiving a universal naming convention (UNC) name used for identifying data stored on the server computer system, a predefined location extension to a share name in the universal naming convention (UNC) name is identified. The identified predefined location extension is utilized for automatic conversion of the stored server data.

15 Claims, 5 Drawing Sheets

---

UNIFORM NAMING CONVENTION (UNC) NAME 300

| SERVER NAME 302 | SHARE NAME 304 | EXTENSION 306 | PATH 308 |
|---|---|---|---|
| SERVER1 302 | DATA1 304 | @ 306 | DAVE.TXT 308 |
| //SERVER1/DATA1@/DAVE.TXT | | | |
| SERVER1 302 | DATA1 304 | @ CODEPAGE 306 (@CP850 306; @UTF8 306; @UNICODEBIG 306) | DAVE.TXT 308 |
| //SERVER1/DATA1@CP850/DAVE.TXT | | | |
| //SERVER1/DATA1@UTF8/DAVE.TXT | | | |
| //SERVER1/DATA1@UNICODEBIG/DAVE.TXT | | | |
| SERVER1 302 | DATA1 304 | @ .PROFILE 306 (@.MYPROFILE 306; @.FRANCAIS 306) | DAVE.TXT 308 |
| //SERVER1/DATA1@.MYPROFILE/DAVE.TXT | | | |
| SERVER1 302 | DATA1 304 | @ CODEPAGE.PROFILE 306 (@CP850.MYPROFILE 306) | DAVE.TXT 308 |
| //SERVER1/DATA1@CP850.MYPROFILE/DAVE.TXT | | | |
| SERVER1 302 | DATA1 304 | | DAVE.TXT 308 |
| //SERVER1/DATA1/DAVE.TXT | | | |

UNIFORM NAMING CONVENTION (UNC) NAME 300

| SERVER SHARE<br>NAME 302 NAME 304 | EXTENSION 306 | PATH 308 |
|---|---|---|
| SERVER1 302  DATA1 304<br>//SERVER1/DATA1@/DAVE.TXT | @ 306 | DAVE.TXT 308 |
| SERVER1 302  DATA1 304<br>(@CP850 306; @UTF8 306; @UNICODEBIG 306)<br>//SERVER1/DATA1@CP850/DAVE.TXT<br>//SERVER1/DATA1@UTF8/DAVE.TXT<br>//SERVER1/DATA1@UNICODEBIG/DAVE.TXT | @ CODEPAGE 306 | DAVE.TXT 308 |
| SERVER1 302  DATA1 304<br>(@.MYPROFILE 306; @.FRANCAIS 306)<br>//SERVER1/DATA1@.MYPROFILE/DAVE.TXT | @ .PROFILE 306 | DAVE.TXT 308 |
| SERVER1 302  DATA1 304<br>(@CP850.MYPROFILE 306)<br>//SERVER1/DATA1@CP850.MYPROFILE/DAVE.TXT | @ CODEPAGE.PROFILE 306 | DAVE.TXT 308 |
| SERVER1 302  DATA1 304<br>//SERVER1/DATA1/DAVE.TXT | | DAVE.TXT 308 |

METHOD AND COMPUTER PROGRAM PRODUCT FOR AUTOMATIC CONVERSION OF DATA BASED ON LOCATION EXTENSION

FIELD OF THE INVENTION

The present invention relates to the data processing field, and more particularly, relates to a method and computer program product for automatic conversion of data based on a location extension in a server computer system.

DESCRIPTION OF THE PRIOR ART

Data exchanged between clients and servers frequently requires some form of conversion. In the case of file serving, for example, the file may exist on the server in the EBCDIC representation, but needs to be converted to ASCII for use on a client personal computer (PC). Similarly for a print server, data may originate on a PC in ASCII, but require conversion to EBCDIC when submitted to a host print server. The situation is exacerbated by the fact that there is not one "ASCII" or "EBCDIC" representation. Data is characterized by a "Codepage" or "Coded Character Set Identifier" (CCSID) which defines the particular representation of the data. While this data exchange problem has historically existed between ASCII and EBCDIC character representations, the native representation of the Java programming language is Unicode, adding another scenario where data conversion is needed.

In general, many known host systems include a different representation of the data on the host than the representation on the client. For example, with Unicode, many host systems, such as a UNIX host system, store Unicode in Big Endian or left-to-right byte ordering format, whereas client personal computers (PCs) use Little Endian or right-to-left byte ordering format.

Many known file protocols do not allow for exchange of data representation information. For example, the SMB protocol used most frequently by Windows and OS/2 clients does not support the exchange of data representation information. Thus even if the data is "tagged" correctly on the server or marked with the server's representation of the data, there is no way to either communicate this representation to the client or know what representation the client expects and do an automatic conversion.

A need exists for a mechanism that allows for automatic conversion of data in a server computer system to provide a correct data representation for a client computer system.

SUMMARY OF THE INVENTION

A principal object of the present invention is to provide a method and computer program product for automatic conversion of data by a server computer system based on a location extension in a universal naming convention (UNC) name. Other important objects of the present invention are to provide such method and computer program product for automatic conversion of data substantially without negative effect and that overcome some of the disadvantages of prior art arrangements.

In brief, a method and computer program product is provided for automatic conversion of data by a server computer system based on a location extension in a universal naming convention (UNC) name. Responsive to receiving a universal naming convention (UNC) name used for identifying data stored on the server computer system, a predefined location extension to a share name in the universal naming convention (UNC) name is identified. The identified predefined location extension is utilized for automatic conversion of the stored server data.

BRIEF DESCRIPTION OF THE DRAWING

The present invention together with the above and other objects and advantages may best be understood from the following detailed description of the preferred embodiments of the invention illustrated in the drawings, wherein:

FIG. 3 is a chart illustrating a uniform or universal naming convention (UNC) including a location extension in accordance with a preferred embodiment of the present invention;

DETAILED DESCRIPTION OF THE PREFERRED EMBODIMENTS

Figure 1:
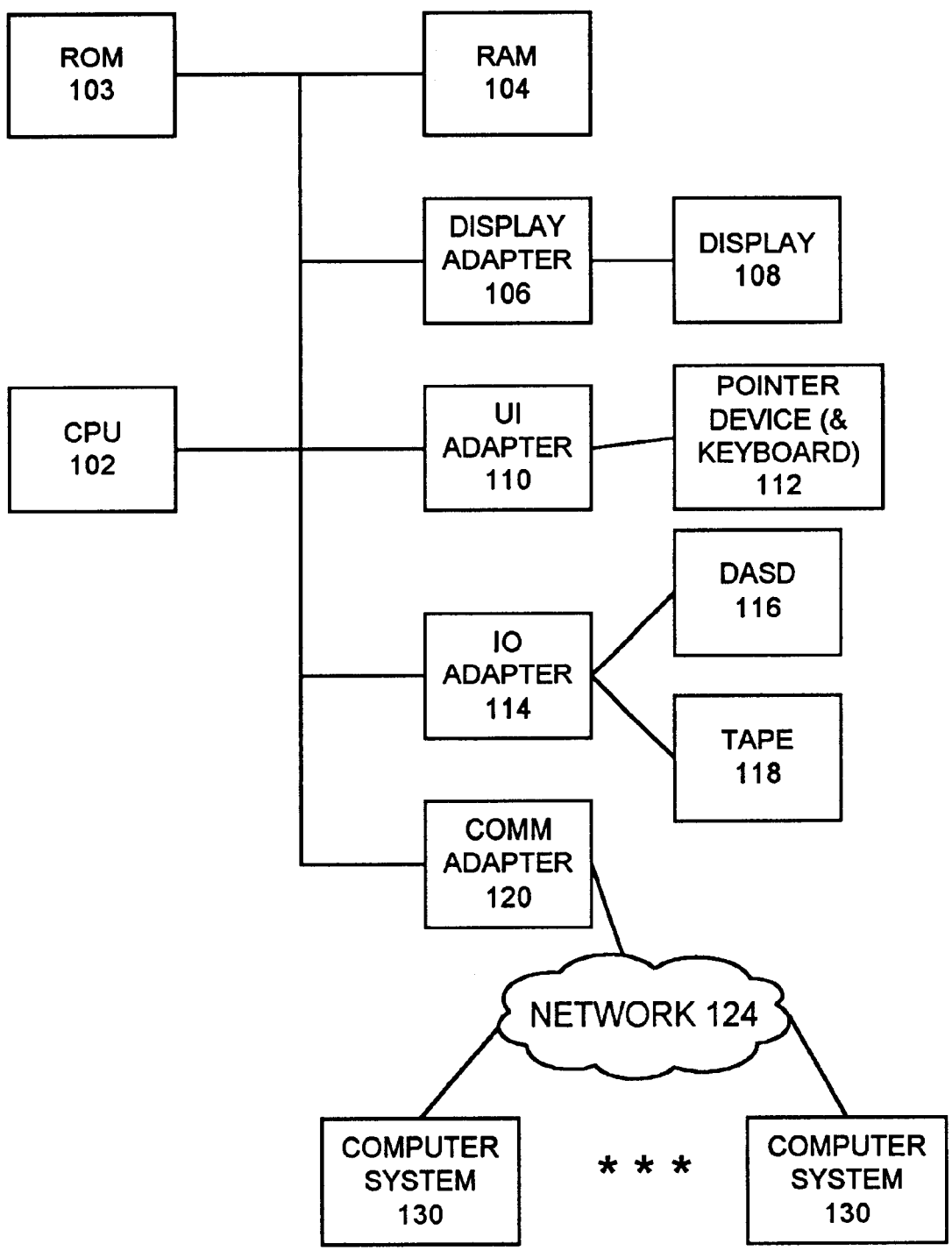
FIG. 1 is a block diagram representation illustrating a server computer system for automatic conversion of data by the server computer system to a correct data representation for a client computer system in accordance with the preferred embodiment.
Figure 2:
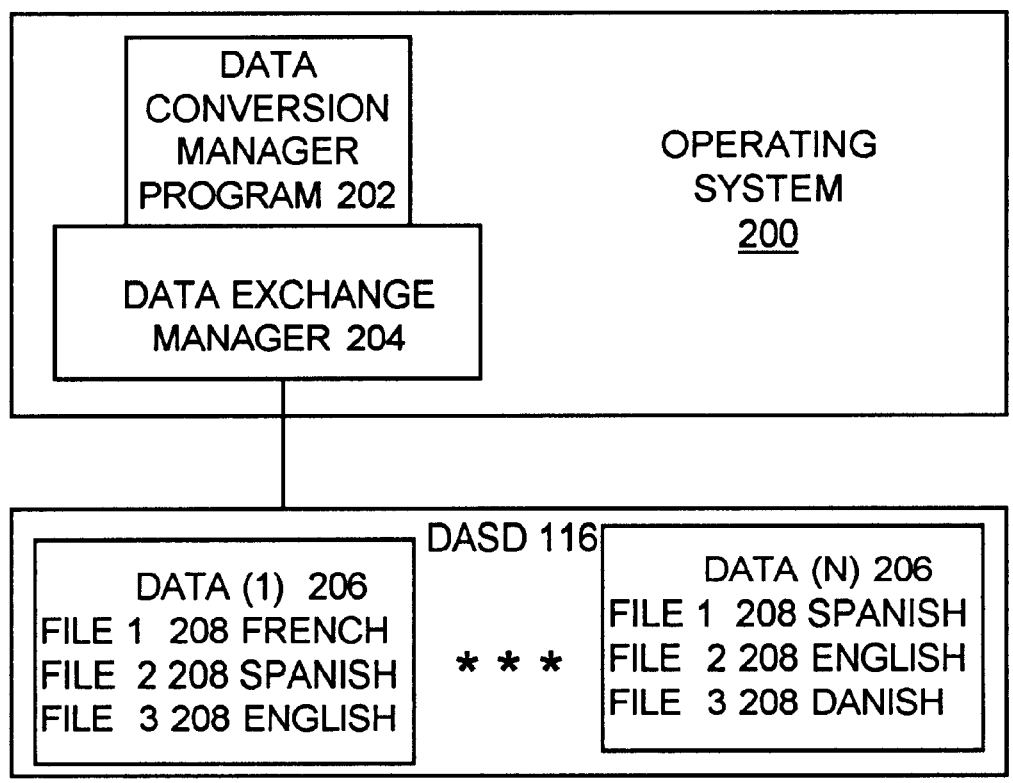
FIG. 2 is a block diagram representation illustrating an operation system of the server computer system of FIG. 1.

Having reference now to the drawings, in FIGS. 1 and 2, there is shown a server computer or data processing system of the preferred embodiment generally designated by the reference character 100. As shown in FIG. 1, server computer system 100 includes a central processor unit (CPU) 102, a read only memory 103, a random access memory or mainstore 104, and a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function for communicating with a network 124 connecting multiple distributed computer systems 130.

As shown in FIG. 2, server computer system 100 includes an operating system 200 including a data conversion manager program 202 of the preferred embodiment used in conjunction with a data exchange manager 204. Server computer system 100 includes a plurality of collections DATA (1–N) 206 of data files 208, for example, stored on the DASD 116.

In accordance with feature of the invention, a location extension or suffix is added to a share name, in a universal naming convention (UNC) name when used by the client computer system 130, that explicitly identifies the conversion that is to occur on the server computer system 100.

Figure 4:
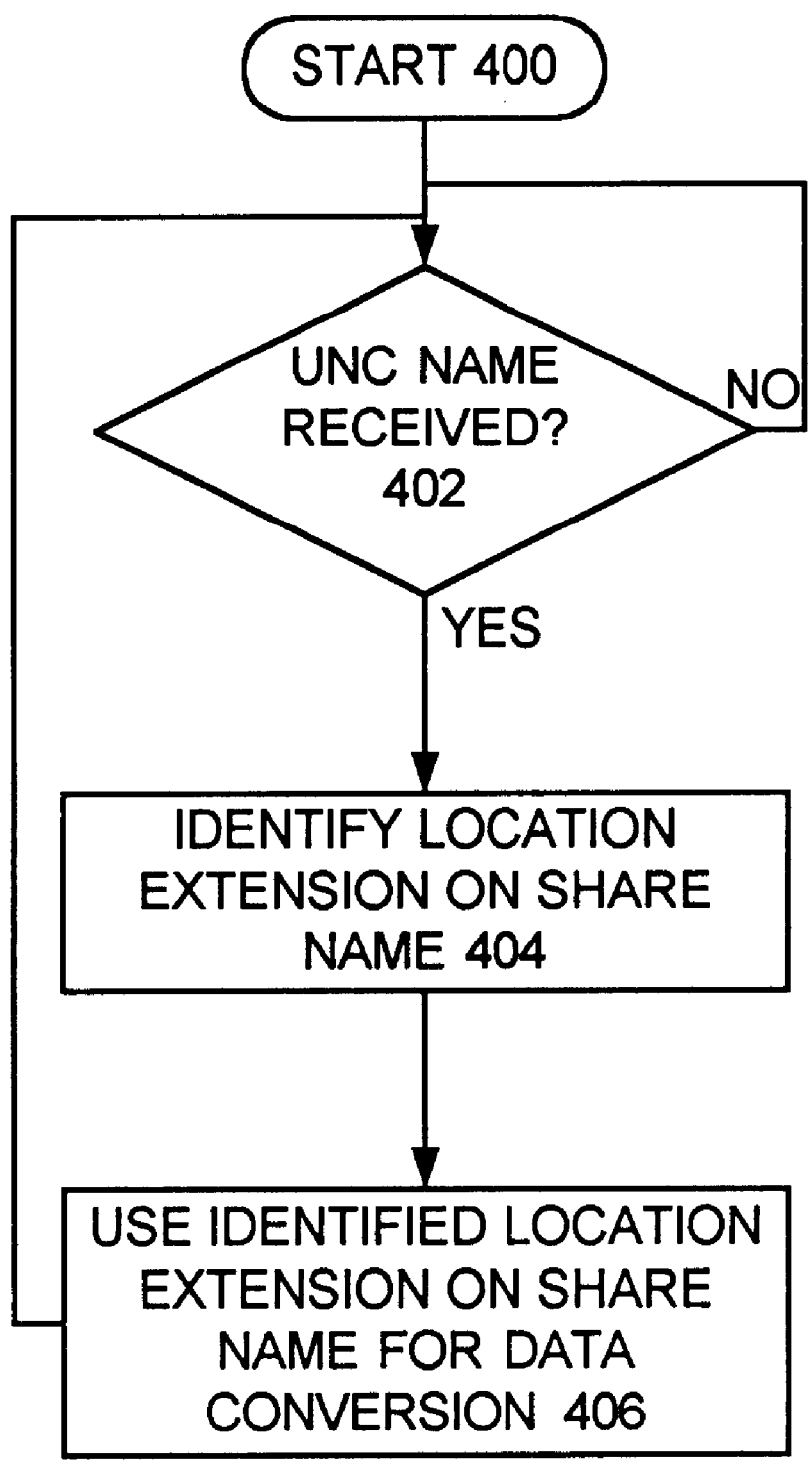
FIG. 4 is a flow chart illustrating sequential operations for implementing automatic conversion of data to a correct data representation for a client computer system by the server computer system of FIG. 1 in accordance with a preferred embodiment of the present invention.

Various commercially available processors could be used for server computer system 100, for example, an IBM personal computer or an IBM AS/400 SMB Server can be used. Central processor unit 102 is suitably programmed to utilize a location extension 306 of FIG. 3 of the preferred embodiment and to execute the flowchart of FIG. 4 of the preferred embodiment.

Referring now to FIG. 3, a chart illustrating a uniform or universal naming convention (UNC) 300 of the preferred embodiment is provided. The data exchange manager 204 uses a universal naming convention method for identifying data stored on a server computer system 100. In the conventional UNC, a path is built up using three components including a server name, a share name and the file path. For example, a server named "DAVESRV" might share a directory named "C:/Products/Lotus123" with the network, giving it the name "L123." A client in the network would access a file in this directory using a UNC name as "//DAVESRV/L123/lot123.exe"

In FIG. 3, the uniform or universal naming convention (UNC) 300 of the preferred embodiment includes a server name 302, a share name 304, a location extension 306 of the preferred embodiment, and a path 308. In FIG. 3, predefined variations of the location extension 306 on a given share name 304 are illustrated. For example, consider the UNC 300 as follows //SERVER1/DATA1@/dave.txt. In this example, the share name 304 or DATA1 is provided with the location extension 306 of @ to define a default conversion. With the assumption that all client computer systems 130 attached to the network 124 are running a defined codepage, such as codepage 850, the default conversion selected by the location extension 306 of @ performs conversions by the server computer system 100 from the data representation in the server file 208 to the PC network codepage 850.

In the illustrated example UNC name 300 as follows //SERVER1/DATA1@CODEPAGE/dave.txt, a specific conversion using Java encoding strings is specified. In the Java environment a series of encoding names have been defined to identify character encodings. The Java encoding strings included following the @ are cp850, UTF8 and UnicodeBig. By including the Java defined encoding strings in a UNC name 300, a much more granular specification of conversion can be made. For example, the following UNC name 300 is used to cause the data in the server file 208 to be converted to UTF8 encoding:

//SERVER1/DATA1@UTF8/myfile.dat

In the illustrated example UNC name 300 as follows //SERVER1/DATA1@.PROFILE/dave.txt, the name of a profile that provides additional information on the conversion that is to occur is specified. For example, a list of file extensions that should be converted might be specified in a profile named MyProf. This allows different applications to define different rules for conversion. A C language compiler might specify a profile that states that the extensions ".C" and ".H" should be converted. Another profile might specify that only ".TXT" should be converted. Different applications can use different UNC names 300 to identify to the server computer system 100 the type of conversion that is to be performed.

Additionally, the profile may contain codepage information. This allows an administrator to define meaningful profile names for users who may not understand codepages. In a network with both french and spanish users, for example, the administrator could define profiles such that users would use the paths:

//SERVER1/DATA1@.Francais/dave.txt

//SERVER1/DATA1@Espagnol/dave.txt

In the illustrated example UNC name 300 as follows //SERVER1/DATA1@CODEPAGE.PROFILE/dave.txt, the name of both an encoding and a profile that provides additional information on the conversion that is to occur are specified. This location extension 306, @CODEPAGE.PROFILE to the share name 304 allows explicit overriding of any codepage specified in the profile as described above.

UNC names are supported by a number of network clients including the Microsoft file sharing client. One significant feature of the data conversion manager program 202 of the preferred embodiment is that it allows the Microsoft file sharing client 130 included in Windows 95, Windows NT, Windows 3.1, and the like to correctly interact with the server computer system 100 for performing appropriate data conversion. This is accomplished without any modification or program assistance on the client computer system 130.

Figure 5:
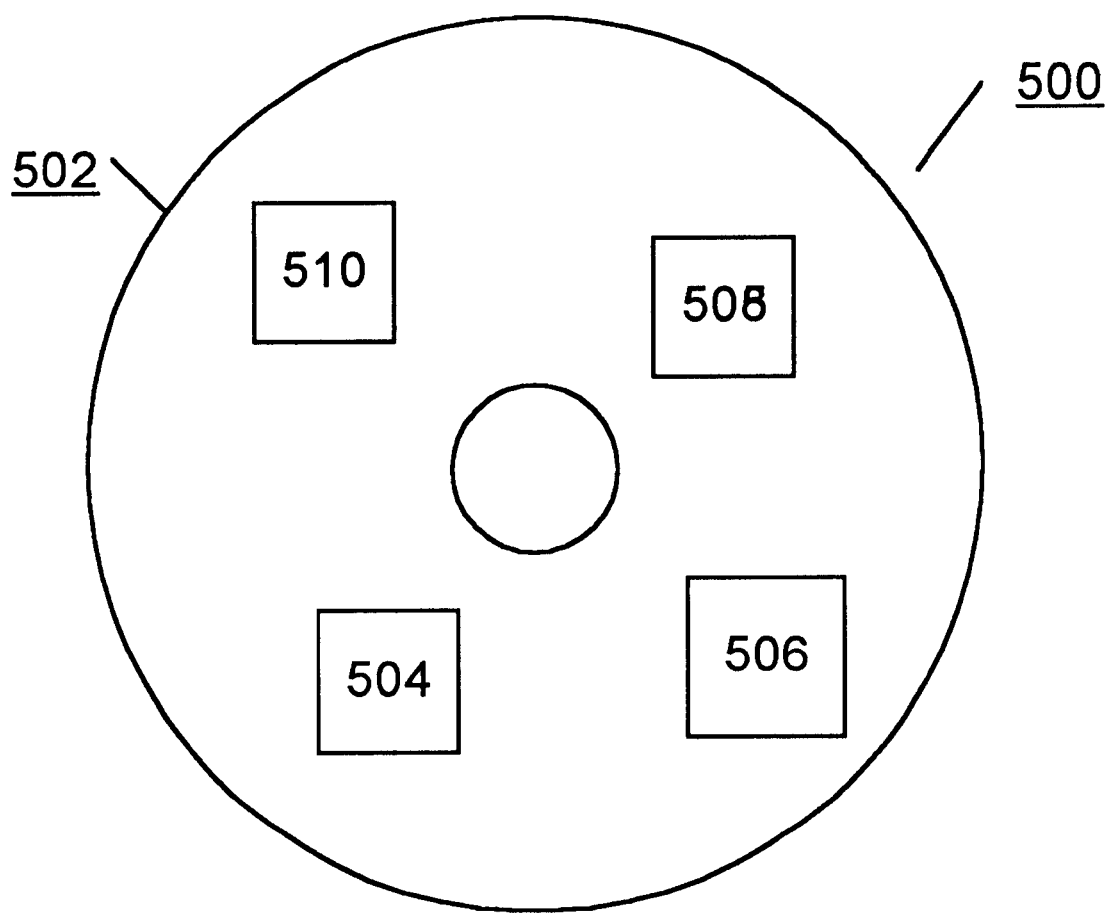
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 506, 504, 508, 510 on the medium 502 for carrying out the methods for automatic data conversion of the preferred embodiment in the server computer system 100 of FIG. 1.

A sequence of program instructions or a logical assembly of one or more interrelated modules defined by the recorded program means 504, 506, 508, 510, direct the server computer system 100 for implementing automatic data conversion of the preferred embodiment.

While the present invention has been described with reference to the details of the embodiments of the invention shown in the drawing, these details are not intended to limit the scope of the invention as claimed in the appended claims.

What is claimed is:

1. A computer implemented method for automatic conversion of data by a server computer system comprising the steps of:

receiving a universal naming convention (UNC) name to identify data stored on the server computer system;

identifying a predefined location extension to a share name in said universal naming convention (UNC) name, said predefined location extension beginning with a pre-defined conversion extension character, said pre-defined conversion extension character being a non-alphabetic and non-numeric special character identifying the beginning of a special type of predefined location extension, said special type of predefined location extension specifying a form of automatic conversion of data; and utilizing said identified predefined location extension for automatic conversion of the data.

2. The computer implemented method for automatic conversion of data by the server computer system as recited in claim 1 wherein said step of identifying said predefined location extension to said share name in said universal naming convention (UNC) name includes the step of identifying a predefined location extension of @; said predefined location extension of @ defining a default conversion of the data.

3. The computer implemented method for automatic conversion of data by the server computer system as recited in claim 1 wherein said step of identifying said predefined location extension to said share name in said universal naming convention (UNC) name includes the step of identifying a predefined location extension of @CODEPAGE; said predefined location extension of @CODEPAGE defining a specific Java defined encoding string for conversion of the data.

4. The computer implemented method for automatic conversion of data by the server computer system as recited in claim 1 wherein said step of identifying said predefined location extension to said share name in said universal naming convention (UNC) name includes the step of identifying a predefined location extension of @.PROFILE; said predefined location extension of @.PROFILE defining a specific profile for conversion of the data.

5. The computer implemented method for automatic conversion of data by the server computer system as recited in claim 1 wherein said step of identifying said predefined location extension to said share name in said universal naming convention (UNC) name includes the step of identifying a predefined location extension of @CODEPAGE.PROFILE; said predefined location extension of @CODEPAGE.PROFILE defining both a specific Java defined encoding string and a specific profile for conversion of the data.

6. A computer program product for automatic conversion of data by a server computer system, said computer program product including a plurality of computer executable instructions stored on a computer readable medium, wherein said instructions, when executed by said server computer system, cause the server computer system to perform the steps of:

receiving a universal naming convention (UNC) name for identifying data stored on the server computer system;

identifying a predefined location extension to a share name in said universal naming convention (UNC) name, said predefined location extension beginning with a pre-defined conversion extension character, said pre-defined conversion extension character being a non-alphabetic and non-numeric special character identifying the beginning of a special type of predefined location extension, said special type of predefined location extension specifying a form of automatic conversion of data; and utilizing said identified predefined location extension for automatic conversion of the stored data.

7. The computer program product for automatic conversion of data as recited in claim 6 wherein said step of identifying said predefined location extension to said share name in said universal naming convention (UNC) name includes the step of identifying a predefined location extension of @; said predefined location extension of @ defining a default conversion of the data.

8. The computer program product for automatic conversion of data as recited in claim 6 wherein said step of identifying said predefined location extension to said share name in said universal naming convention (UNC) name includes the step of identifying a predefined location extension of @CODEPAGE; said predefined location extension of @CODEPAGE defining a specific Java defined encoding string for conversion of the data.

9. The computer program product for automatic conversion of data as recited in claim 6 wherein said step of identifying said predefined location extension to said share name in said universal naming convention (UNC) name includes the step of identifying a predefined location extension of @.PROFILE; said predefined location extension of @.PROFILE defining a specific profile for conversion of the data.

10. The computer program product for automatic conversion of data as recited in claim 6 wherein said step of identifying said predefined location extension to said share name in said universal naming convention (UNC) name includes the step of identifying a predefined location extension of @CODEPAGE.PROFILE; said predefined location extension of @CODEPAGE.PROFILE defining both a specific Java defined encoding string and a specific profile for conversion of the data.

11. A server computer system for storing a collection of data files for use by at least one client computer system, said server computer system comprising:

a data exchange manager for receiving a universal naming convention (UNC) name for identifying data stored on the server computer system;

a data conversion manager coupled to said data exchange manager for identifying a predefined location extension to a share name in said universal naming convention (UNC) name, said predefined location extension beginning with a pre-defined conversion extension character, said pre-defined conversion extension character being a non-alphabetic and non-numeric special character identifying the beginning of a special type of predefined location extension, said special type of predefined location extension specifying a form of automatic conversion of data; and said data conversion manager utilizing said identified predefined location extension for automatic conversion of the data.

12. The server computer system as recited in claim 11 wherein said data conversion manager for identifying said predefined location extension and utilizing said identified predefined location extension for automatic conversion of the data includes means for identifying a predefined location extension of @; wherein said predefined location extension of @ defines a default conversion of the data.

13. The server computer system as recited in claim 11 wherein said data conversion manager for identifying said predefined location extension and utilizing said identified predefined location extension for automatic conversion of the data includes means for identifying a predefined location extension of @CODEPAGE; wherein said predefined location extension of @CODEPAGE defines a specific Java defined encoding string for conversion of the data.

14. The server computer system as recited in claim 11 wherein said data conversion manager for identifying said predefined location extension and utilizing said identified predefined location extension for automatic conversion of the data includes means for identifying a predefined location extension of @.PROFILE; wherein said predefined location extension of @.PROFILE defines a specific profile for conversion of the data.

15. The server computer system as recited in claim 11 wherein said data conversion manager for identifying said predefined location extension and utilizing said identified predefined location extension for automatic conversion of the data includes means for identifying a predefined location extension of @CODEPAGE.PROFILE; wherein said predefined location extension of @CODEPAGE.PROFILE defines both a specific Java defined encoding string and a specific profile for conversion of the data.

* * * * *